US009958066B2

(12) United States Patent
Ichikawa et al.

(10) Patent No.: US 9,958,066 B2
(45) Date of Patent: May 1, 2018

(54) RANGE SWITCHING DEVICE

(71) Applicant: AISIN AW CO., LTD., Anjo-shi, Aichi-ken (JP)

(72) Inventors: Shinya Ichikawa, Anjo (JP); Kazuki Kojima, Nukata (JP); Yoshimitsu Hyodo, Nishio (JP); Koji Makino, Okazaki (JP); Kenichi Tsuchida, Nishio (JP)

(73) Assignee: AISIN AW CO., LTD., Anjo (JP)

( * ) Notice: Subject to any disclaimer, the term of this patent is extended or adjusted under 35 U.S.C. 154(b) by 0 days. days.

(21) Appl. No.: 15/108,409

(22) PCT Filed: Jan. 22, 2015

(86) PCT No.: PCT/JP2015/051721
§ 371 (c)(1),
(2) Date: Jun. 27, 2016

(87) PCT Pub. No.: WO2015/111667
PCT Pub. Date: Jul. 30, 2015

(65) Prior Publication Data
US 2016/0334015 A1    Nov. 17, 2016

(30) Foreign Application Priority Data
Jan. 23, 2014    (JP) .................................. 2014-010407

(51) Int. Cl.
F16H 63/34    (2006.01)
F16H 61/02    (2006.01)
(Continued)

(52) U.S. Cl.
CPC ..... F16H 63/3483 (2013.01); F16H 61/0206 (2013.01); F16H 61/12 (2013.01);
(Continued)

(58) Field of Classification Search
CPC ...... F16H 61/0206; F16H 61/12; F16H 61/22; F16H 3/34; F16H 3/3425
See application file for complete search history.

(56) References Cited

U.S. PATENT DOCUMENTS 5,409,434 A * 4/1995 Furukawa ........... F16H 61/0206
477/130
6,055,879 A   5/2000 Abe et al.
(Continued)

FOREIGN PATENT DOCUMENTS

| JP | H09-280349 A | 10/1997 |
| JP | 2009-068588 A | 4/2009 |
| JP | 2014-196771 A | 10/2014 |

OTHER PUBLICATIONS

Apr. 28, 2015 Search Report issued in International Patent Application No. PCT/JP2015/051721.

*Primary Examiner* — Jacob S. Scott
*Assistant Examiner* — Tinh Dang
(74) *Attorney, Agent, or Firm* — Oliff PLC

(57) ABSTRACT

A range switching device for switching supply and non-supply of a source pressure based on a hydraulic pressure from a hydraulic pressure generating source to a parking device, the parking device being switched into a parking release state while the source pressure is supplied thereto and being switched into a parking state while the source pressure is not supplied thereto.

17 Claims, 6 Drawing Sheets

(51) Int. Cl.
*F16H 61/12* (2010.01)
*F16H 61/22* (2006.01)
(52) U.S. Cl.
CPC ............ *F16H 61/22* (2013.01); *F16H 63/34* (2013.01); *F16H 63/3425* (2013.01)

(56) References Cited

U.S. PATENT DOCUMENTS

| | | | |
|---|---|---|---|
| 7,635,057 B2 * | 12/2009 | Gierer | F16H 61/0206 192/3.58 |
| 7,954,394 B2 | 6/2011 | Yoshioka et al. | |
| 8,210,990 B2 * | 7/2012 | Yoshioka | F16H 61/0206 477/130 |
| 2008/0227595 A1 | 9/2008 | Pfister et al. | |
| 2010/0093490 A1 | 4/2010 | Gierer et al. | |

* cited by examiner

FIG.6

|   | RS1 | RS2 |
|---|-----|-----|
| P | ON  | OFF |
| R | ON  | ON  |
| N | OFF | ON  |
| D | OFF | OFF |

RANGE SWITCHING DEVICE

BACKGROUND

The present technique relates to a range switching device for switching between ranges according to an operation performed by a driver, the ranges including a parking (P) range, a neutral (N) range, a drive (D) range, and a reverse (R) range, and specifically relates to a range switching device that uses a shift-by-wire method in which a range switching operation performed by the driver is transmitted via an electric signal.

Conventional examples of range switching devices using a shift-by-wire method include a range switching device that transmits a range switching operation of a driver to solenoid valves via an electric signal and switches a range switching valve by operating the solenoid valves.

It has been proposed to configure such a range switching device so as to have a parking switching valve that switches between a parking release state and a parking state, the parking release state being achieved by supplying a hydraulic pressure to a parking device, and the parking state being achieved by supplying no hydraulic pressure to the parking device. (See Japanese Patent Application Publication No. 2014-196771, which had not been published at the time of filing an original application.) In a device described in Japanese Patent Application Publication No. 2014-196771, for example, even if a valve sticks during switching from the parking release state to the parking state, an input port to which the hydraulic pressure to be supplied to the parking device is input and an output port from which the input hydraulic pressure is output to the parking device are allowed to communicate with a drain port from which the hydraulic pressure is drained, so that the supply of the hydraulic pressure to the parking device is blocked. Thereby, the parking device is switched from the parking release state into the parking state.

SUMMARY

However, in the range switching device of Japanese Patent Application Publication No. 2014-196771, although the parking device can be switched from the parking release state into the parking state in a case in which a valve sticks during switching from the parking release state into the parking state, the parking device cannot be switched from the parking release state into the parking state in a case in which a valve sticks before the input port and the output port are allowed to communicate with the drain port.

In addition, in the range switching device of Japanese Patent Application Publication No. 2014-196771, two solenoid valves are used to operate the range switching device, it is therefore structurally difficult to downsize the device.

An exemplary aspect of the present disclosure provides a range switching device that is able to switch a parking device into a parking state even if a parking switching valve is supplied with a hydraulic pressure in a case in which a valve sticks in a position where a parking release state is achieved, while downsizing the device.

According to an exemplary aspect of the present disclosure, a range switching device for switching supply and non-supply of a source pressure based on a hydraulic pressure from a hydraulic pressure generating source to a parking device, the parking device being switched into a parking release state while the source pressure is supplied thereto and being switched into a parking state while the source pressure is not supplied thereto, includes: a solenoid valve that pressure-regulates the source pressure to output a control pressure; and a parking switching valve, wherein: the parking switching valve includes a first spool that is movable to a first position and to a second position, a biasing member that is disposed on one end side of the first spool and biases the first spool to the first position, a second spool that is movable to a third position and to a fourth position, a first input port to which the source pressure is supplied, a first output port that is blocked from communication with the first input port while the first spool is in the first position and is in communication with the first input port while the first spool is in the second position, a second input port that is in communication with the first output port, a second output port that is in communication with the parking device, is in communication with the second input port while the second spool is in the third position, and is blocked from communication with the second input port while the second spool is in the fourth position, a third input port that is in communication with the first output port to receive input of the source pressure so that the second spool is biased to a direction of the fourth position by the source pressure, and a control port to which the control pressure is input so as to apply the control pressure output from the solenoid valve to other end side of the first spool and one end side of the second spool, in a case in which the control pressure is input to the control port and is applied to the other end side of the first spool and the one end side of the second spool, the first spool is moved to reach the second position against biasing force of the biasing member and the second spool is moved to reach the third position, so that the source pressure is supplied to the parking device through the second output port, and in a case in which the control pressure is not input to the control port and the first spool sticks in the second position, the second spool is moved to reach the fourth position by the source pressure supplied to the third input port, so that the source pressure is not supplied to the parking device.

Accordingly, even if the first spool sticks in the second position, when the output of the control pressure by a solenoid valve is stopped in order to achieve the parking state, the second spool is moved to reach the fourth position by the source pressure being supplied from the first output port to the third input port, thereby the source pressure is not supplied to the parking device from the second output port, which makes it possible to switch the parking device into the parking state. That is, even in a case in which a valve stick occurs in a position where the parking release state is achieved and the hydraulic pressure is supplied to the parking switching valve, it is possible to switch the parking device into the parking state by stopping the output of the control pressure by the solenoid valve, which makes it possible to downsize the device.

BRIEF DESCRIPTION OF THE DRAWINGS

FIG. 6 shows an operation table of a first solenoid valve and a second solenoid valve shown in FIG. 5.

DETAILED DESCRIPTION OF EMBODIMENTS

Figure 1:
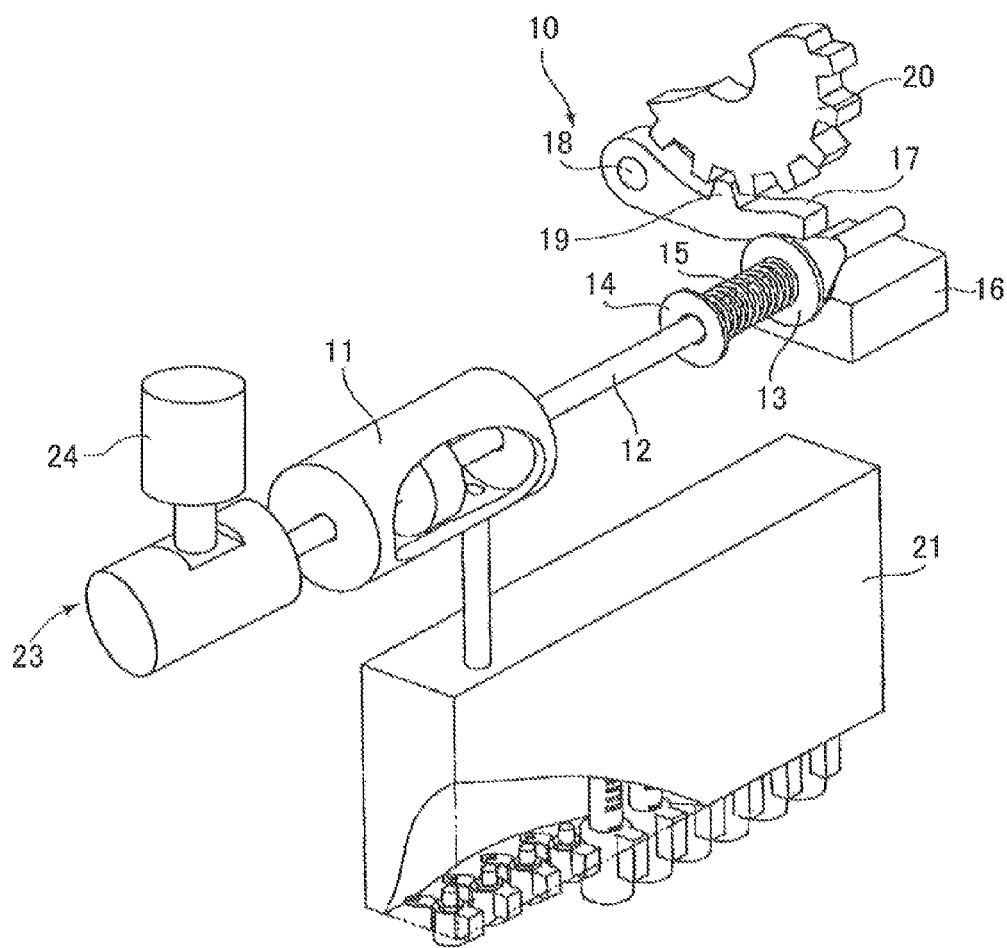
FIG. 1 is a schematic drawing showing a parking device according to the present embodiment.

Modes for carrying out the disclosure will be described with reference to FIG. 1 to FIG. 6.

A range switching device 1 according to the disclosure is incorporated in an automatic transmission (e.g., a stepped automatic transmission or a continuously variable transmission [CVT]) that is installed in a vehicle, and further in a hybrid drive device and the like. The range switching device 1 is configured so as to include: a first, a second, and a third solenoid valves RS1, RS2, and RS3, which will be explained later; a first switching valve 6 that is switched by the first solenoid valve RS1; a second switching valve 7 that is switched by the second solenoid valve RS2; and a parking switching valve 2 that is switched by the third solenoid valve RS3. The first, the second, and the third solenoid valves RS1, RS2, and RS3 are controlled based on a control signal from a controlling unit (not shown in the drawing) that generates the control signal based on a shift signal from a shift lever (not shown in the drawing) with which the driver of the vehicle selects one of a parking (P) range, a neutral (N) range, a drive (D) range, a reverse (R) range, and the like.

As shown in FIG. 1, the first, the second, and the third solenoid valves RS1, RS2, and RS3, the first switching valve 6, the second switching valve 7, and the parking switching valve 2 are provided in a valve body 21 within the automatic transmission. Further, as shown in FIG. 1, a parking device 10 is connected to the range switching device 1. The range switching device 1 according to the present embodiment uses a shift-by-wire method by which the shift signal and the control signal described above are each in the form of an electric signal. Thus, the explanation above describes that one of the ranges is selected by using the shift lever. However, another configuration is acceptable, for example, in which one of the ranges is selected by an operation of a button.

The parking device 10 basically includes a parking cylinder 11, a parking rod 12, a support 16, a parking pawl 17, and a parking gear 20. The parking cylinder 11 is connected to the valve body 21, and the parking rod 12 is axially movably disposed so as to, on a basal end side thereof, penetrate the parking cylinder 11. A wedge 13 is provided on a distal end side of the parking rod 12. The wedge 13 is in a shape of a circular cone and is loosely fitted so as to be movable in the axial direction. A spring 15 is disposed between a flange part 14 fixed to the parking rod 12 and the wedge 13. The support 16 is disposed beneath the distal end side of the parking rod 12 and is positioned so that the wedge 13 can be inserted into and removed from a position between the support 16 and the parking pawl 17. The parking pawl 17 is disposed so as to be swingable in substantially an upward-downward direction, while pivoting on its axis 18 on a basal end side thereof. The parking pawl 17 has, on an upper side of a middle portion thereof, a claw part 19 projecting so as to be engageable with and disengageable from the parking gear 20 that is fixed to an output shaft (not shown in the drawing) of the automatic transmission.

As the parking device 10 is configured as described above, when a line pressure (a source pressure) based on an oil pump (not shown in the drawing) functioned as a hydraulic pressure generating source that is driven by an engine (not shown in the drawing) is applied to the parking cylinder 11, the parking rod 12 moves toward the parking cylinder 11 against a biasing force of the spring 15, so that the wedge 13 is removed from a position between the support 16 and the parking pawl 17 and so that the parking pawl 17 swings in the downward direction in such a manner that the claw part 19 is disengaged from the parking gear 20, and the parking device 10 is thus in a parking release state. On the other hand, when the line pressure applied to the parking cylinder 11 is removed, the parking rod 12 moves toward the parking pawl 17 by the biasing force of the spring 15 so that the wedge 13 is inserted into the position between the support 16 and the parking pawl 17 and so that the parking pawl 17 swings in the upward direction in such a manner that the claw part 19 is engaged with the parking gear 20, and the parking device 10 is thus in a parking state.

According to the present embodiment, a lock mechanism 23 that is capable of electrically locking the parking device 10 to the parking release state is provided. The lock mechanism 23 is disposed in a base end side of the parking rod 12, and has a solenoid 24 for locking. And the lock mechanism 23 drives the solenoid 24 by energizing the solenoid 24 to fix (lock) a position of the parking rod 12 that is in a position in which the parking release state is achieved, and unlock this fixation. Thereby, it is possible to maintain the parking release state even if the hydraulic pressure is drained from the parking cylinder 11. In addition, the solenoid 24 is configured so as to maintain a state when energizing the solenoid 24 is stopped. That is, a plunger of the solenoid 24 is moved to a position in which the parking rod 12 is locked or a position in which the parking rod 12 is unlocked by energizing the solenoid 24, and the plunger is maintained in the position in a state in which the solenoid is not energized. Therefore, when so-called all-off failure occurs in which, for example, wiring from a power source is disconnected, a state of the parking device at the time when the all-off failure occurs is maintained. Thereby, the parking release state is maintained in a case in which the all-off failure occurs during the vehicle is travelling in the D range or the R range, which makes it possible to keep inertia travelling in the N range or travelling in the D range or the R range, and the parking state of the parking mechanism is maintained in a case in which the all-off failure occurs during the vehicle is parked in the P range, which makes it possible to maintain the parking state of the vehicle. Since the parking device 10 and the range switching device 1 according to the present embodiment are mounted on the hybrid vehicle, the hydraulic pressure is not supplied to the parking cylinder 11 in a case in which the vehicle is travelling with the engine being stopped. Therefore, in such a travelling state, the solenoid 24 is driven to lock the position of the parking rod 12 so that the parking device 10 can be maintained in the parking release state even if the hydraulic pressure is not supplied to the parking cylinder 11.

Figure 2:
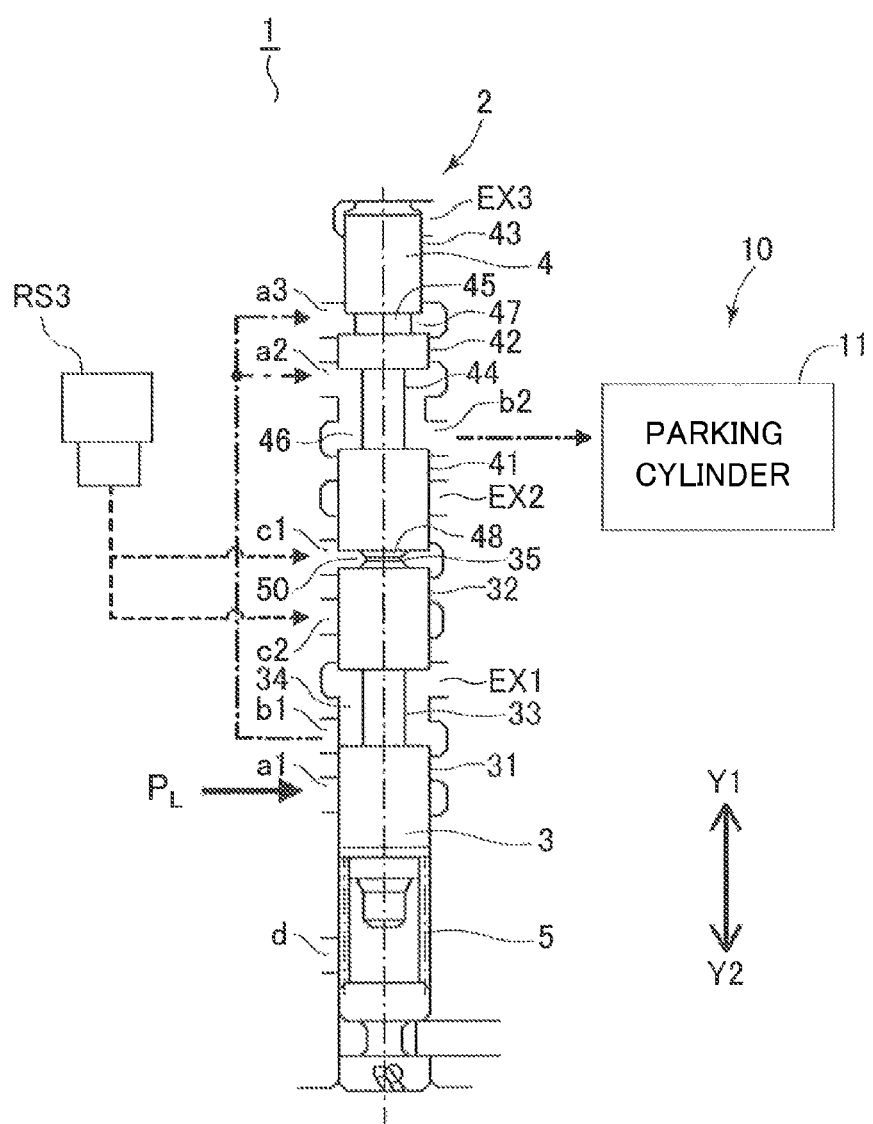
FIG. 2 is a circuit diagram showing a parking state of a range switching device according to the present embodiment.
Figure 3:
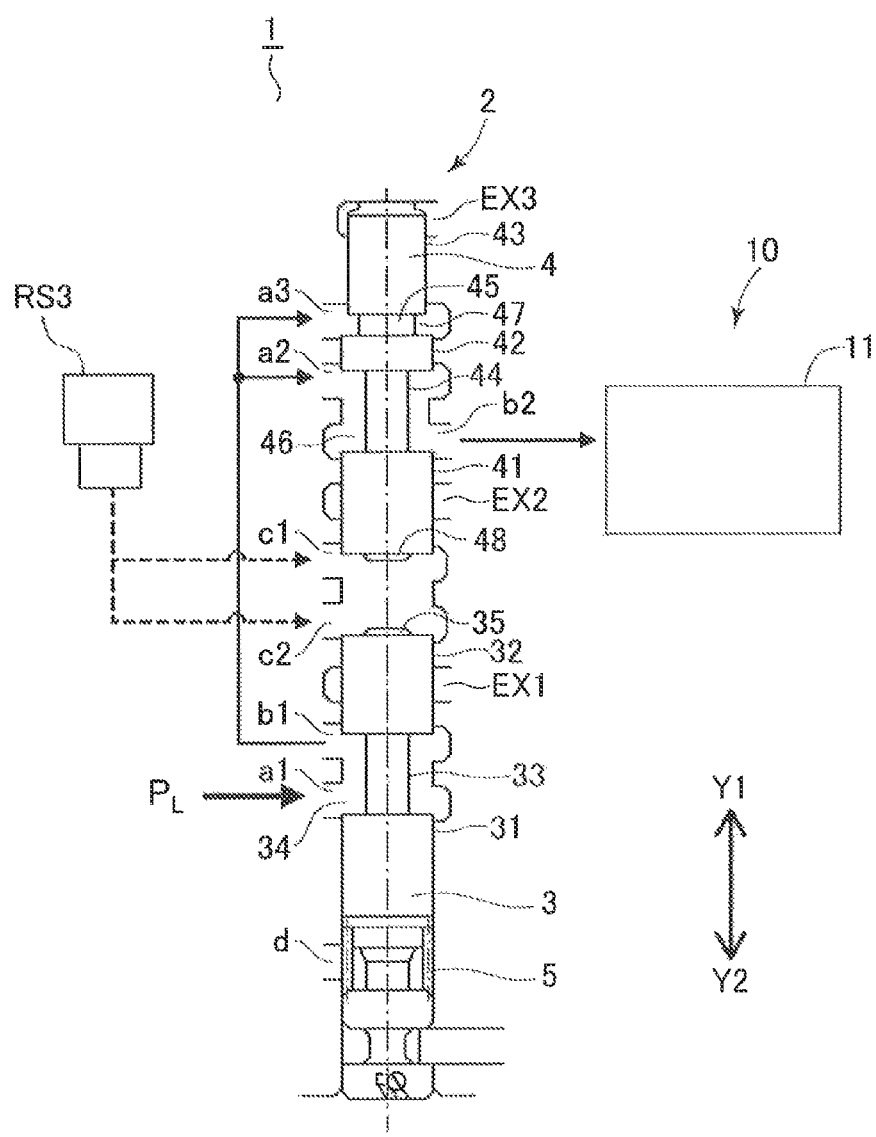
FIG. 3 is a circuit diagram showing a parking release state of the range switching device according to the present embodiment.
Figure 4:
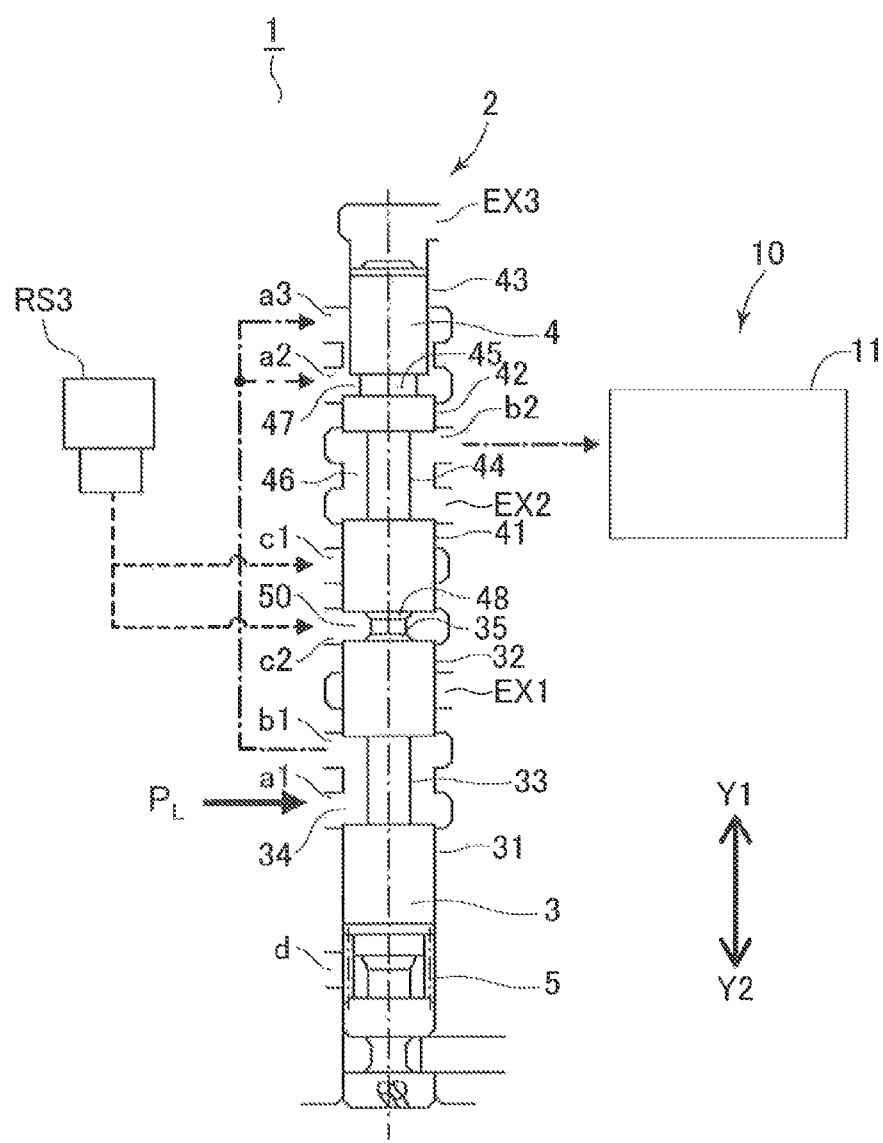
FIG. 4 is a circuit diagram showing a state in which the range switching device is switched into a parking state in a case when a first spool sticks in the range switching device according to the present embodiment.

The range switching device 1 is for switching a state in which a line pressure is supplied to the parking device 10 and a state in which the line pressure is not supplied to the parking device 10 as described above. The range switching device 1 is provided with the third solenoid valve RS3 and the parking switching valve 2 as shown in FIGS. 2 to 4, and also is provided with the first switching valve 6 and the second switching valve 7 for switching between ranges including the parking (P) range, the neutral (N) range, the drive (D) range, and the reverse (R) range, the first solenoid valve RS1, and the second solenoid valve RS2 as shown in FIG. 5. To each of the first, the second, and the third solenoid valves RS1, RS2, and RS3, a supply pressure based on the line pressure (source pressure) $P_L$ is supplied, and an electric signal from a controlling unit (not shown in the drawing) is input according to an operation performed by the driver on the lever or the button.

Figures 5A, 5B, 5C:
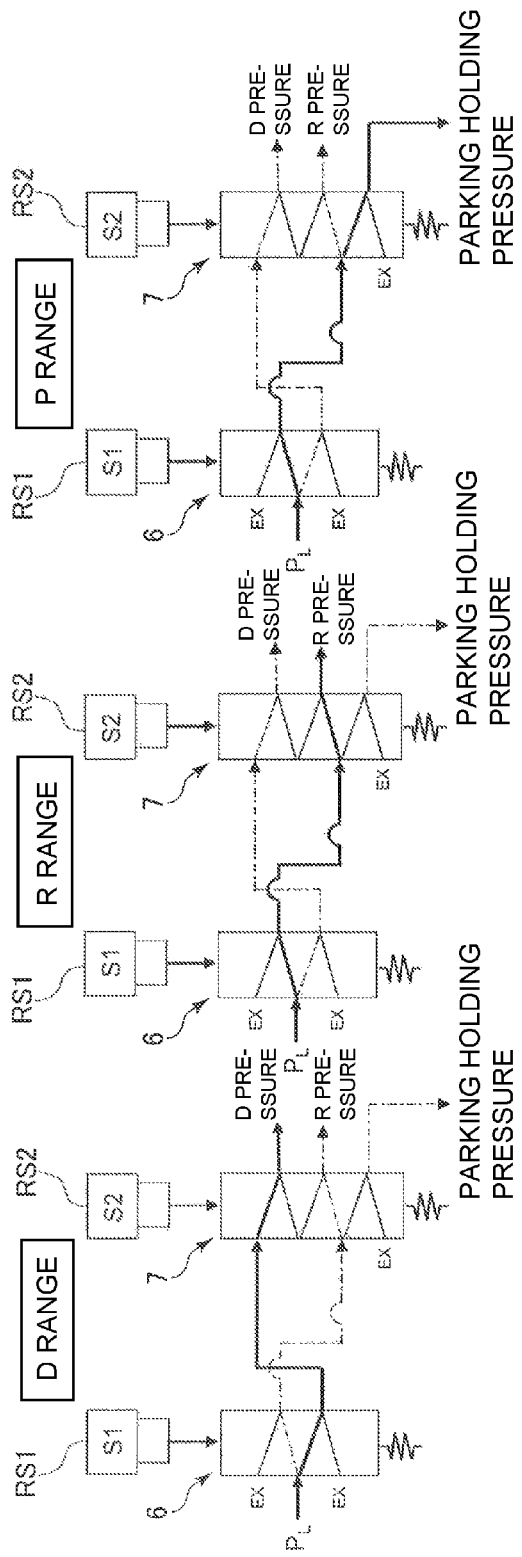
FIG. 5 is a circuit diagram showing a state in which each of (FIG. 5A) a D range pressure, (FIG. 5B) a R range pressure, and (FIG. 5C) a parking holding pressure is output in the range switching device according to the present embodiment

The first, the second, and the third solenoid valves RS1, RS2, and RS3 pressure-adjust the line pressure to output the control pressure. The first and the second solenoid valves RS1, RS2 among the solenoid valves switch each range as shown in FIG. 5 by operating as illustrated in the operation table shown in FIG. 6. First, when the driver performs an operation so that the vehicle goes into the D range, each of the first solenoid valve RS1 and the second solenoid valve RS2 goes into the OFF state, and then, the first switching valve 6 and the second switching valve 7 are switched as shown in FIG. 5A, and a D range pressure (D pressure) is output. When the driver performs an operation so that the vehicle goes into the R range, each of the first solenoid valve RS1 and the second solenoid valve RS2 goes into the ON state, and then, the first switching valve 6 and the second switching valve 7 are switched as shown in FIG. 5B, and R range pressure (R pressure) is output.

Further, when the driver performs an operation so that the vehicle goes into the P range, the first solenoid valve RS1 goes into the ON state and the second solenoid valve RS2 goes into the OFF state. Then, the first switching valve 6 and the second switching valve 7 are switched as shown in FIG. 5C, and a parking holding pressure is output. The parking holding pressure is flowed to an input port d of the parking switching valve 2, which will be described later on. Still, when the driver performs an operation so that the vehicle goes into the N range, the first solenoid valve RS1 goes into the OFF state and the second solenoid valve RS2 goes into the ON state so that the N range is achieved. Therefore, none of the D pressure, the R pressure or the parking holding pressure is output. In addition, the first solenoid valve RS1 is a so-called normally-closed valve that outputs no control pressure when the first solenoid valve RS1 goes into an unenergized state, and the second solenoid valve RS2 is a so-called normally-open valve that outputs the control pressure when the second solenoid valve RS2 goes into an unenergized state. Therefore, in a case in which the first solenoid valve RS1 and the second solenoid valve RS2 go into an unenergized state (off-failure) because of, for example, an electrical disconnection or the like, the N range is achieved. Furthermore, the third solenoid valve RS3 is a so-called normally-closed valve that outputs no control pressure when the third solenoid valve RS3 goes into an unenergized state.

The parking switching valve 2 is configured in such a manner that the line pressure is supplied to the parking device 10 when the third solenoid valve RS3 outputs the control pressure, and the line pressure is not supplied to the parking device 10 when the third solenoid valve RS3 does not output the control pressure. Thereby, the parking switching valve 2 include a first spool 3, a second spool 4, and a spring 5 as a biasing member. The parking switching valve 2 also includes a first input port a1, a first output port b1, a second input port a2, a second output port b2, a third input port a3, and two control ports, namely a first control port c1 and a second control port c2. The switching valve 2 further includes a plurality of drain ports EX1, EX2, EX3.

The first spool 3 is capable of moving to reach a first position shown in FIG. 2 and a second position shown in FIGS. 3 and 4, includes two land portions 31, 32, of which the diameters are the same, sequentially from one end side of the first spool 3, and includes a narrow portion 33 formed between the land portions 31, 32, of which the diameter is smaller than the diameters of the lands portions 31, 32. And an oil chamber 34 is formed between the land portions 31, 32. Besides, a projecting portion 35 of which the diameter is smaller than the diameter of the land portion 32 is provided on other end portion of the first spool 3 that is opposed to the second spool 4 so as to project to the other end side (to the second spool side).

The second spool 4 is arranged adjacent to the first spool 3 on the same axis in the other end side of the first spool 3, is in a third position shown in FIG. 2 and F3 when the first spool 3 is in the first position, and is capable of moving to reach the third position and a fourth position shown in FIG. 4 when the first spool 3 is in the second position. And the second spool 4 includes two large-diameter land portions 41 (a first land portion), 42 (a second land portion) of which the diameters are the same and one small-diameter land portion 43 (a third land portion) of which the diameter is smaller than the diameters of each of the large-diameter land portions 41, 42, sequentially from the one end side of the second spool 4 (the first spool 3 side). Each of the large-diameter land portions 41, 42 has the same diameter as the diameter of each of the land portions 31, 32 of the first spool 3. The second spool 4 also includes a narrow portion 44 formed between the large-diameter portions 41, 42, of which the diameter is smaller than the diameter of each of the large-diameter portions 41, 42, and a small-diameter portion 45 formed between the large-diameter land portion 42 and the small-diameter land portion 43 which are parts in the axial direction, of which an outer diameter is smaller than an outer diameter of each of the large-diameter land portion 42 and the small-diameter land portion 43 which are parts in both sides in the axial direction. An oil chamber 46 is formed between the large-diameter land portions 41, 42, and an oil chamber 47 is formed between the large-diameter land portion 42 and the small-diameter land portion 43, respectively. Besides, a projecting portion 48 of which the diameter is smaller than the diameter of the large-diameter land portion 41 is provided on the one end portion of the second spool 4 that is opposed to the first spool 3 so as to project to the first spool side.

The spring 5 is provided in a compressed state on the one end side of the first spool 3 (an opposite side from the second spool 4) so as to bias the first spool 3 in a first direction (Y1 direction). In addition, the spring 5, which will be explained later, has an elastic force that can move the first spool 3 to reach the second position in a case in which the control pressure is applied to the first spool 3. According to the present embodiment, an input port d to which the parking holding pressure output from a first switching valve 6 and a second switching valve 7 is applied is provided on the first spool 3 on an opposite side from the second spool 4 as mentioned above, so that the first spool 3 is held in the first position and the second spool 4 is held in the third position respectively by the parking holding pressure output in a case of the P range.

The line pressure $P_L$ is supplied to the first input port a1. The first output port b1 is blocked from communication with the first input port a1 when the third spool 3 is in the first position, and is in communication with the first input port a1 when the third spool 3 is in the second position. That is, the land portion 31 closes the first input port a1 by moving the first spool 3 to reach the first position as shown in FIG. 2 so that the supply of the line pressure $P_L$ from the first input port a1 to the first output port b1 is blocked. At this time, the narrow portion 33 is opposed to the first output port b1 and the drain port EX1, and the first output port b1 is in communication with the drain port EX1 through the oil chamber 34, thereby oil inside the first output port b1 is drained. On the other hand, the narrow portion 33 is opposed to the first input port a1 and the first output port b1 by moving the first spool 3 to reach the second position as shown in FIG. 3, so that the first input port a1 is in communication with the first output port b1 through the oil chamber 34. At this time, the land portion 32 closes the drain port EX1, thereby communication between the first output port b1 and the drain port EX1 is blocked.

The second input port a2 is in communication with the first output port b1, and is supplied with the line pressure $P_L$ through the first output port b1. Therefore, as mentioned above, communication between the first input port a1 and the first output port b1 is blocked in a case in which the first spool 3 is in the first position. Therefore, the line pressure $P_L$ is not supplied to the second input port a2. Then, communication between the first input port a1 and the first output port b1 is allowed in a case in which the first spool 3 is in the second position. Therefore, the line pressure $P_L$ is supplied to the second input port a2.

The second output port b2 is in communication with the parking cylinder 11 of the parking device 10. The second output port b2 is in communication with the second input port a2 when the second spool 4 is in the third position, and is blocked from communication when the second spool 4 is in the fourth position. That is, the narrow portion 44 is opposed to the second input port a2 and the second output port b2 by moving the second spool 4 to reach the third position as shown in FIG. 2, so that the second input port a2 is in communication with the second output port b2 through the oil chamber 46. At this time, the large-diameter land portion 41 closes the drain port EX2, and communication between the second output port b2 and the drain port EX2 is blocked. In addition, the drain port EX3 is provided on an end portion side of the small-diameter land portion 43 so that the second spool 4 can be moved smoothly to reach the third position. Furthermore, no hydraulic pressure is applied to the end portion side of the small-diameter land portion 43.

On the other hand, the large-diameter land portion 42 is positioned between the second input port a2 and the second output port b2 by moving the second spool 4 to reach the fourth position as shown in FIG. 4, and the supply of the line pressure $P_L$ from the second input port a2 to the second output port b2 is blocked. At this time, the narrow portion 44 is opposed to the second output port b2 and the drain port EX2, and the second output port b2 is in communication with the drain port EX2 through the oil chamber 46, so that oil inside the second output port b2 is drained.

Meanwhile, the small-diameter land portion 43 is positioned between the second input port a2 and the third input port a3, which will be explained later, in a case in which the second spool 4 moves to reach the fourth position, so that the second input port a2 is in communication with the third input port a3. However, even in this case, the small-diameter land portion 43 keeps blocking communication between the third input port a3 and the drain port EX3. Therefore, it is possible to prevent the line pressure $P_L$ supplied to the second input port a2 and the third input port a3 from being drained to the drain port EX3 even if the second spool 4 moves to reach the fourth position.

The third input port a3 is in communication with the first output port b1, and the line pressure $P_L$ supplied through the first output port b1 is input to the third input port a3. The line pressure $P_L$ input to the third input port a3 is applied to the second spool 4. That is, the oil chamber 47 is opposed to the third input port a3 in a case in which the second spool 4 is in the third position as shown in FIG. 3, so that the line pressure $P_L$ supplied to the third input port a3 through the first output port b1 is applied to the second spool 4. In addition, the oil chamber 47 is opposed to the second input port a2 in a case in which the second spool 4 is in the fourth position as shown in FIG. 4. Therefore, in this position, the line pressure $P_L$ supplied from the second input port a2 and the third input port a3 is applied to the second spool 4. Here, the large-diameter land portion 42 and the small-diameter land portion 43 that exist on both sides of the oil chamber 47 in the axial direction have different outer diameters respectively, and other end surface of the large-diameter land portion 42 of which the diameter is larger than the diameter of the small-diameter land portion 43 has a larger area (pressure receiving area) to which the line pressure $P_L$ is applied than that of one end surface of the small-diameter land portion 43. Therefore, larger pressure is applied to the large-diameter land portion 42 than the small-diameter land portion 43 by the line pressure $P_L$ being supplied to the oil chamber 47, so that the second spool 4 is biased to the first spool 3 side (Y2 direction).

The control pressure output from the third solenoid valve RS3 is input to the first control port c1 and the second control port c2. The input control pressure is applied to the other end side of the first spool 3 and the one end side of the second spool 4. According to the present embodiment, as mentioned above, projecting portions 35, 48 are provided respectively on the other end portion of the first spool 3 and the one end portion of the second spool 4, where the first spool 3 and the second spool 4 are opposed to each other. Therefore, in a case in which the other end portion of the first spool 3 and the one end portion of the second spool 4 are in contact, a clearance (oil chamber) 50 is formed between end surfaces of the first spool 3 and the second spool 4 that are opposed to each other, in other words, between other end surface of the first spool 3 and one end surface of the second spool 4. The control pressure supplied to the first control port c1 and the second control port c2 is applied to the first spool 3 and the second spool 4 through the clearance 50.

Specifically, the first control port c1, as shown in FIG. 2, is provided in a position that is opposed to the clearance 50 formed in a case in which the first spool 3 is in the first position and the second spool 4 is in the third position respectively. The second control port c2, as shown in FIG. 4, is provided in a position that is opposed to the clearance 50 formed in a case in which the first spool 3 is in the second position and the second spool 4 is in the fourth position respectively. In either position, it is configured in a manner that the control pressure supplied to the clearance 50 through the first and the second control ports c1, c2 is applied to the first spool 3 and the second spool 4. Still, a projecting portion that forms the clearance 50 may be formed on at least one of end surfaces of the first spool 3 and the second spool 4 that are opposed to each other. Here, the land portion 32 of the first spool 3 and the large-diameter land portion 41 of the second spool 4 that are opposed to each other to form the clearance 50 have the same diameter. Therefore, each receiving area is substantially the same, and substantially the same force is applied to each of the first spool 3 and the second spool 4 by the control pressure supplied to the clearance 50 through the first and the second control ports, thereby the first spool 3 and the second spool 4 are respectively biased to opposite directions from each other, in other words, the first spool 3 is biased in the Y2 direction and the second spool 4 is biased in the Y1 direction respectively.

In the range switching device 1 configured as mentioned above, when the driver of the vehicle performs an operation on the lever or the button so that the vehicle goes into the parking (P) range, the third solenoid valve RS3 is energized to stop the output of the control pressure. In addition, the first solenoid valve RS1 is turned ON and the second solenoid valve RS2 is turned OFF so that the first switching valve 6 and the second switching valve 7 are operated as shown in FIG. 5C to output the parking holding pressure. As shown in FIG. 2, in a case in which the control pressure is not output from the third solenoid valve RS3, the first spool 3 is biased in the Y1 direction by a biasing force of the spring 5 and is moved to reach the first position. In this state, the line pressure $P_L$ is not supplied to the second input port a2 because communication between the first input port a1 and the first output port b1 is blocked as mentioned above. Thereby, even if the second spool 4 is in the third position and the second input port a2 is in communication with the second output port b2, the line pressure $P_L$ is not supplied to the parking cylinder 11 of the parking device 10, so that the parking device 10 is held in the parking state. At this time, the parking holding pressure is applied to the input port d so that the parking state is reliably maintained.

Figure 6:
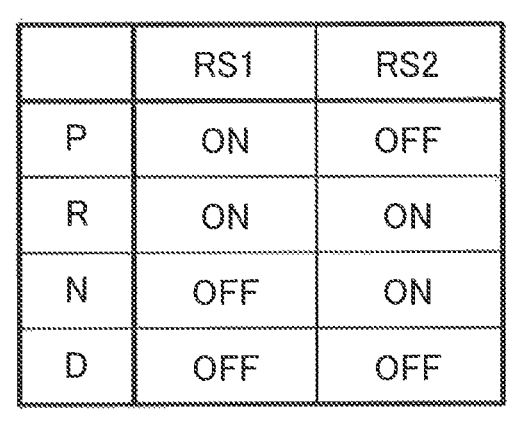

On the other hand, when the driver performs an operation on the lever or the button so that the vehicle goes into any one of the drive (D) range, the neutral (N) range, or the reverse (R) range, the third solenoid valve RS3 is energized to output the control pressure. In addition, the first solenoid valve RS1 and the second solenoid valve RS2 are operated so that the vehicle goes into any one of R, N, or D range as shown in FIG. 6, and the first switching valve 6 and the second switching valve 7 are operated as shown in the figures other than FIG. 5C, so that the output of the parking holding pressure is stopped. In a case in which the control pressure is output from the third solenoid valve RS3 in a state as shown in FIG. 2 and the control pressure is applied to the first control port c1, the first spool 3 is moved to reach the second position against the biasing force of the spring 5 as shown in FIG. 3. At this time, the parking holding pressure is not applied to the input port d so that the first spool 3 can be moved to reach the second position.

Meanwhile, the first input port a1 is in communication with the first output port b1 and the third input port a3 is supplied with the line pressure $P_L$ so that the line pressure $P_L$ is applied to the second spool 4 through the oil chamber 47. However, since the oil chamber 47 is formed at a position where the small-diameter portion 45 is, the difference in the pressure-receiving area between an area (pressure-receiving area) of an end surface (other end surface) in a circumference of the small-diameter portion 45 of the large-diameter land portion 42 to which the line pressure $P_L$ is applied and a pressure-receiving area (one end surface) of an end surface in a circumference of the small-diameter portion 45 of the small-diameter land portion 43 is adequately smaller than an area (pressure-receiving area) of an end surface (one end surface) of the large-diameter land portion 41 to which the control pressure is applied through the clearance 50. As a result, the second spool 4 is maintained in the third position by the control pressure that is applied to the first control port c1, irrespective of the line pressure $P_L$ that is applied to the large-diameter land portion 42 through the third input port a3. In other words, the second spool 4 is maintained in the third position by the difference in the pressure receiving area. Meanwhile, the line pressure $P_L$, the control pressure, and each pressure-receiving area may be appropriately adjusted if such a condition is satisfied. As mentioned, the second input port a2 is in communication with the second output port b2 in a case in which the second spool 4 is in the third position, so that the line pressure $P_L$ supplied from the first output port b1 to the second input port a2 is supplied to the parking cylinder 11 through the second input port a2 to switch the parking device 10 into the parking release state.

Here, it is assumed that the first spool 3 sticks in the second position as shown in FIG. 3. When the driver of the vehicle performs operation on the lever or the button so that the vehicle goes into the parking (P) range in order to switch the parking device 10 into the parking state in this state, the third solenoid valve RS3 is energized to stop the output of the control pressure. However, even if the output of the control pressure by the third solenoid valve RS3 is stopped, the first spool 3 is not moved from the second position because it sticks. Therefore, the first input port a1 keeps communicating with the first output port b1. Accordingly, the line pressure $P_L$ is applied to the second input port a2 and the third input port a3 through the first output port b1. At this time, the second spool 4 that is in the third position is biased in the Y2 direction as mentioned above by the line pressure $P_L$ being supplied from the third input port a3 to the oil chamber 47. Since no control pressure is applied to the second spool 4, as shown in FIG. 4, the second spool 4 is moved to reach the fourth position by the line pressure $P_L$ supplied to the third input port a3. In this state, communication between the second input port a2 and the second output port b2 is blocked. Therefore, even if the line pressure $P_L$ is supplied from the first output port b1, the line pressure $P_L$ is not supplied from the second output port b2 to the parking cylinder 11, so that the parking device 10 is switched into the parking state.

Consequently, in a case in which the first spool 3 sticks in the second position as shown in FIG. 3 while the engine is stopped, for example, it is possible to prevent the parking state from being carelessly released even if the line pressure $P_L$ is supplied because of the startup of the engine. That is, the line pressure $P_L$ is not supplied to the parking device 10 while the engine is stopped. Therefore, the parking device 10 is in the parking state. In a state in which the parking switching valve 2 is in the state as shown in FIG. 3, the line pressure $P_L$ can be supplied to the parking device 10 when the engine is started up. However, the line pressure $P_L$ is applied to the third input port a3 as well and the second spool 4 is moved to reach the fourth position, so that the supply of the line pressure $P_L$ to the parking device 10 is blocked. Accordingly, the parking state cannot be released carelessly.

In a state as shown in FIG. 4, the clearance 50 formed between the end surfaces of the first spool 3 and the second spool 4 that are opposed to each other is opposed to the second control port c2. Thereby, in a case in which the control pressure is output from the third solenoid valve RS3 in order to achieve the parking release state again from such a state, the control pressure is supplied to the clearance 50 through the second control port c2, so that the second spool 4 is biased to the Y1 direction. Meanwhile, the second spool 4 is moved to reach the third position, which is shown in FIG. 3, by the difference in the pressure-receiving area as mentioned above, irrespective of the line pressure $P_L$ that is supplied to the third input port a3 to apply to the second spool 4. The line pressure $P_L$ is supplied to the parking cylinder 11 through the second input port a2, so that the parking device 10 is switched into the parking release state. Accordingly, the vehicle can travel on its own to a repair plant and the like even if the first spool sticks.

Yet according to the present embodiment, it is possible to switch the parking device 10 into the parking state even if the second spool 4 sticks in the third position as shown in FIG. 3. That is, when the driver of the vehicle performs an operation on the lever or the button so that the vehicle goes into the parking (P) range in order to switch the parking device 10 into the parking state in this situation, the third solenoid valve RS3 is energized to stop the output of the control pressure. As a result, the first spool 3 is biased by the spring 5 in the Y1 direction and is moved to reach the first position, so that the first spool 3 is in a state as shown in FIG. 2. In this state, communication between the first input port a1 and the first output port b1 is blocked, thereby the line pressure $P_L$ is not supplied to the parking cylinder 11 so that the parking device 10 is switched into the parking state.

In addition, in a case in which the first spool 3 sticks in the first position as shown in FIG. 2 and the second spool 4 sticks in the fourth position as shown in FIG. 4 respectively, each spool is in a position where the line pressure $P_L$ is not supplied to the parking device 10. Accordingly, the parking state is not released carelessly even if the engine is started again in this state.

Yet according to the present embodiment, as mentioned above, the third solenoid valve RS3 is a so-called normally-closed type that outputs no control pressure when the third solenoid valve RS3 goes into an unenergized state. Accordingly, for example, when the vehicle is running in the drive (D) range, or the vehicle is in the neutral (N) range or the reverse (R) range, in a case in which the third solenoid valve RS3 goes into an off-failure (non-operated state) because of, for example, an electrical disconnection or the like, the control pressure is not supplied to the first control port c1 and the second control port c2 so that the first spool 3 is held in the first position and the second spool 4 is held in the fourth position respectively. As a result, the line pressure $P_L$ is not supplied to the parking cylinder 11, so that the parking device 10 can be switched into the parking state.

Here, as mentioned above, the parking device 10 includes a lock mechanism 23 that is capable of locking the parking device 10 to the parking release state electrically, and the solenoid 24 of the lock mechanism 23 is configured to maintain a state when energizing is stopped if the solenoid 24 is once unenergized. Accordingly, in a case in which the third solenoid valve RS3 and the solenoid 24 are unenergized (off-failure) because of an electrical disconnection or the like in a state in which the vehicle is running in the D range or the R range, although the line pressure $P_L$ is not supplied to the parking cylinder 11 from the parking switching valve 2, the parking release state is maintained because of the lock mechanism 23.

Besides, at this time, in a case in which both of the first solenoid valve RS1 and the second solenoid valve RS2 go into to an off-failure (unenergized state) because of an electrical disconnection or the like, the vehicle goes into the N range as aforementioned, so that the parking holding pressure is not supplied. Furthermore, when both of the first solenoid valve RS1 and the second solenoid valve RS2 go into to an off-failure, another countermeasure against such a failure may be taken so that a range pressure is output at that time. Accordingly, even if an off-failure occurs while the vehicle is running in the D range or the R range, the vehicle can keep running in the range. On the other hand, in a case in which another countermeasure against such a failure is not taken, the vehicle goes into the N range. Therefore, the vehicle can travel in an inertia state. In either way, even if an off-failure occurs while the vehicle is running in the D range or the R range, the vehicle can keep an inertia-running in the N range, or can keep running in the D range or the R range.

On the other hand, in a case in which the third solenoid valve RS3 and the solenoid 24 go into an off-failure while the vehicle stops in the P range, the line pressure $P_L$ is not supplied to the parking cylinder 11 from the parking switching valve 2, and the parking state is maintained because of the lock mechanism 23. Accordingly, the parking state of the vehicle can be maintained.

As a consequence, a range switching device (1) (see, for example, FIGS. 2 to 4) according to the disclosure for switching supply and non-supply of a source pressure based on a hydraulic pressure from a hydraulic pressure generating source to a parking device (10), the parking device (10) being switched into a parking release state while the source pressure is supplied thereto and being switched into a parking state while the source pressure is not supplied thereto, includes:

a solenoid valve (RS3) that pressure-regulates the source pressure to output a control pressure; and a parking switching valve (2), wherein the parking switching valve (2) includes a first spool (3) that is movable to a first position and to a second position, a biasing member (5) that is disposed on one end side of the first spool (3) and biases the first spool (3) to the first position, a second spool (4) that is movable to a third position and to a fourth position, a first input port (a1) to which the source pressure is supplied, a first output port (b1) that is blocked from communication with the first input port (a1) while the first spool (3) is in the first position and is in communication with the first input port (a1) while the first spool (3) is in the second position, a second input port (a2) that is in communication with the first output port (b1), a second output port (b2) that is in communication with the parking device (10), is in communication with the second input port (a2) while the second spool (4) is in the third position, and is blocked from communication with the second input port (a2) while the second spool (4) is in the fourth position, a third input port (a3) that is in communication with the first output port (b1) to receive input of the source pressure so that the second spool (4) is biased to a direction of the fourth position by the source pressure, and control ports (c1, c2) to which the control pressure is input so as to apply the control pressure output from the solenoid valve (RS3) to other end side of the first spool (3) and one end side of the second spool (4), in a case in which the control pressure is input to the control ports (c1, c2) and is applied to the other end side of the first spool (3) and the one end side of the second spool (4), the first spool (3) is moved to reach the second position against biasing force of the biasing member (5) and the second spool (4) is moved to reach the third position, so that the source pressure is supplied to the parking device (10) through the second output port (b2), and in a case in which the control pressure is not input to the control ports (c1, c2) and the first spool (3) sticks in the second position, the second spool (4) is moved to reach the fourth position by the source pressure supplied to the third input port (a3), so that the source pressure is not supplied to the parking device (10).

Accordingly, in a case in which the output of the control pressure by the third solenoid valve RS3 is stopped in order to achieve the parking state even if the first spool 3 sticks in the second position, the second spool 4 is moved to reach the fourth position by the line pressure $P_L$ being supplied from the first output port b1 to the third input port a3. Thereby, the line pressure $P_L$ is not supplied from the second output port b2 to the parking device 10, so that the parking device (10) is switched into the parking state. That is, even in a case in which a valve stick occurs at a position where the parking release state is achieved and the parking switching valve 2 is supplied with the hydraulic pressure, the parking device 10 can be switched into the parking state by stopping the output of the control pressure by a single solenoid valve, which is the third solenoid valve RS3, which makes it possible to downsize the device In addition, the range switching device (1) (see, for example, FIGS. 2 to 4) wherein, the second spool (4) includes a first land portion (41), a second land portion (42), and a third land portion (43) sequentially from one end side of the second spool (4), a pressure receiving area on one end surface of the third land portion (43) to which the source pressure input to the third input port (a3) is applied is smaller than a pressure receiving area on other end surface of the second land portion (42) to which the source pressure is applied, and a difference in a pressure receiving area between the pressure receiving area on the other end surface of the second land portion (42) and the pressure receiving area on the one end surface of the third land portion (43) is configured to be smaller than a pressure receiving area on one end surface of the first land portion (41) to which the control pressure input to the control ports (c1, c2) is applied.

By defining the relation of the pressure receiving area of each of the land portions as mentioned above, the parking device 10 can be switched into the parking state by stopping the output of the control pressure by the third solenoid valve RS3 in a case in which the first spool 3 sticks in the second position. Also, by restarting the output of the control pressure by the third solenoid valve RS3, the second spool 4 that has been in the fourth position is moved to reach the third position and the line pressure $P_L$ is supplied from the second output port b2 to the parking device 10, so that the parking device 10 can be switched into the parking release state. Accordingly, it is possible to obtain an effect mentioned above with a simple structure.

The range switching device (1) (see, for example, FIGS. 2 to 4) wherein, the first spool (3) and the second spool (4) are provided with projecting portions (35, 48) on at least one of other end portion of the first spool (3) and one end portion of the second spool (4) so that a clearance (50) is formed between other end surface of the first spool (3) and one end surface of the second spool (4) when the other end portion of the first spool (3) and the one end portion of the second spool (4) are in contact with each other. And the control pressure supplied to the control ports (c1, c2) is applied to the other end surface of the first spool (3) and the one end surface of the second spool (4) through the clearance (50).

By forming the projecting portions 35, 48 in each end portion where the first spool 3 and the second spool 4 are opposed to each other as mentioned above, the clearance 50 can be formed between end surfaces where the first spool 3 and the second spool 4 are opposed to each other with a simple structure, and the control pressure can be applied to the first spool 3 and the second spool 4 through the clearance 50.

The range switching valve (1) (see, for example, FIGS. 2 to 4) wherein, the control ports (c1, c2) are provide in two positions, namely a position that is opposed to the clearance 50 formed when the first spool (3) is in the first position and the second spool (4) is in the third position respectively, and a position that is opposed to the clearance (50) formed when the first spool (3) is in the second position and the second spool (4) is in the fourth position respectively.

By this feature, the clearance 50 is opposed to each of the first control port c1 and the second control port c2 in respective positions when the first spool 3 and the second spool 4 are respectively moved to the first position and the third position, and to the second position and fourth position. Accordingly, the control pressure can be applied to each of the first spool 3 and the second spool 4 in respective positions, so that the parking release state can be achieved by supplying the control pressure in respective positions.

The range switching valve (1) wherein, in a case in which the first spool (3) sticks in the second position and the control pressure is input to the control ports (c1, c2), the second spool (4) is moved to reach the third position by the control pressure supplied to the control ports (c1, c2), so that the source pressure is supplied to the parking device (10) through the second output port (b2).

Accordingly, for example, the output of the control pressure by the third solenoid valve RS3 is stopped in a state in which the first spool 3 sticks in the second position and the supply of the line pressure $P_L$ to the parking device 10 is stopped to switch the parking device 10 from the parking release state into the parking state, and thereafter, in a case in which the output of the control pressure by the third solenoid valve RS3 is restarted, the second spool 4 that has been in the fourth position is moved to reach the third position so as to supply the line pressure $P_L$ from the second output port b2 to the parking device 10. As a result, the parking device 10 can be switched from the parking state to the parking release state.

According to the present embodiment, although the first spool 3 and the second spool 4 are provided inside a single parking switching valve 2, it is acceptable to provide each of the first spool 3 and the second spool 4 in different switching valves respectively. In such a case, the third solenoid valve RS3 may be configured to be able to output the control pressure to the parking switching valve that is provided with the first spool 3 and to the parking switching valve that is provided with the second spool 4.

In the description above, the line pressure is used as the source pressure. However, it is acceptable to use a supply pressure obtained by adjusting the line pressure. In other words, it is possible to apply the present technique to a configuration with any other type of source pressure as long as it is possible to cause the parking cylinder to operate and to hold the spool with a force that is stronger than the biasing force of the spring included in the parking switching valve.

INDUSTRIAL APPLICABILITY

The range switching device can be mounted on a vehicle, such as a car, truck and the like, especially, the range switching device may be suitably applied to a vehicle that requires downsizing of the device, and a parking device that can be switched into a parking state even if a hydraulic pressure is supplied to a parking switching valve in a case in which a valve stick occurs at a position where a parking release state is achieved.

The invention claimed is:

1. A range switching device for switching supply and non-supply of a source pressure based on a hydraulic pressure from a hydraulic pressure generating source to a parking device, the parking device being switched into a parking release state while the source pressure is supplied thereto and being switched into a parking state while the source pressure is not supplied thereto, the range switching device comprising:
  a solenoid valve that pressure-regulates the source pressure to output a control pressure; and
  a parking switching valve, wherein:
  the parking switching valve includes
    a first spool that is movable to a first position and to a second position,
    a biasing member that is disposed on one end side of the first spool and biases the first spool to the first position,
    a second spool that is movable to a third position and to a fourth position,
    a first input port to which the source pressure is supplied,
    a first output port that is blocked from communication with the first input port while the first spool is in the first position and is in communication with the first input port while the first spool is in the second position,
    a second input port that is in communication with the first output port,
    a second output port that is in communication with the parking device, is in communication with the second input port while the second spool is in the third position, and is blocked from communication with the second input port while the second spool is in the fourth position,
    a third input port that is in communication with the first output port to receive input of the source pressure so that the second spool is biased to a direction of the fourth position by the source pressure, and
    a control port to which the control pressure is input so as to apply the control pressure output from the solenoid valve to other end side of the first spool and one end side of the second spool,
  in a case in which the control pressure is input to the control port and is applied to the other end side of the first spool and the one end side of the second spool, the first spool is moved to reach the second position against biasing force of the biasing member and the second spool is moved to reach the third position, so that the source pressure is supplied to the parking device through the second output port, and
  in a case in which the control pressure is not input to the control port and the first spool sticks in the second position, the second spool is moved to reach the fourth position by the source pressure supplied to the third input port, so that the source pressure is not supplied to the parking device.

2. The range switching device according to claim 1, wherein the second spool includes a first land portion, a second land portion, and a third land portion sequentially from the one end side of the second spool, and is configured so that a pressure receiving area on one end surface of the third land portion to which the source pressure input to the third input port is applied is smaller than a pressure receiving area on other end surface of the second land portion to which the source pressure is applied, and so that a difference between the pressure receiving area on the other end surface of the second land portion and the pressure receiving area on the one end surface of the third land portion is smaller than a pressure receiving area on one end surface of the first land portion to which the control pressure input to the control port is applied.

3. The range switching device according to claim 2, wherein the first spool and the second spool form a gap between other end surface of the first spool and one end surface of the second spool when other end portion of the first spool and one end portion of the second spool are in contact with each other, by a projecting portion provided on at least one of the other end portion of the first spool and the one end portion of the second spool, and apply the control pressure that is supplied to the control port to the other end surface of the first spool and the one end surface of the second spool through the gap.

4. The range switching device according to claim 3, wherein the control port are provided in two positions, which are a position that is opposed to the gap formed when the first spool is in the first position and the second spool is in the third position respectively and a position that is opposed to the gap formed when the first spool is in the second position and the second spool is in the fourth position respectively.

5. The range switching device according to claim 4, wherein, in a case in which the first spool sticks in the second position and the control pressure is input to the control port, the second spool is moved to reach the third position by the control pressure supplied to the control port and the source pressure is supplied to the parking device through the second output port.

6. The range switching device according to claim 2, wherein, in a case in which the first spool sticks in the second position and the control pressure is input to the control port, the second spool is moved to reach the third position by the control pressure supplied to the control port and the source pressure is supplied to the parking device through the second output port.

7. The range switching device according to claim 3, wherein, in a case in which the first spool sticks in the second position and the control pressure is input to the control port, the second spool is moved to reach the third position by the control pressure supplied to the control port and the source pressure is supplied to the parking device through the second output port.

8. The range switching device according to claim 1, wherein the first spool and the second spool form a gap between other end surface of the first spool and one end surface of the second spool when other end portion of the first spool and one end portion of the second spool are in contact with each other, by a projecting portion provided on at least one of the other end portion of the first spool and the one end portion of the second spool, and apply the control pressure that is supplied to the control port to the other end surface of the first spool and the one end surface of the second spool through the gap.

9. The range switching device according to claim 8, wherein the control port are provided in two positions, which are a position that is opposed to the gap formed when the first spool is in the first position and the second spool is in the third position respectively and a position that is opposed to the gap formed when the first spool is in the second position and the second spool is in the fourth position respectively.

10. The range switching device according to claim 9, wherein, in a case in which the first spool sticks in the second position and the control pressure is input to the control port, the second spool is moved to reach the third position by the control pressure supplied to the control port and the source pressure is supplied to the parking device through the second output port.

11. The range switching device according to claim 8, wherein, in a case in which the first spool sticks in the second position and the control pressure is input to the control port, the second spool is moved to reach the third position by the control pressure supplied to the control port and the source pressure is supplied to the parking device through the second output port.

12. The range switching device according to claim 1, wherein, in a case in which the first spool sticks in the second position and the control pressure is input to the control port, the second spool is moved to reach the third position by the control pressure supplied to the control port and the source pressure is supplied to the parking device through the second output port.

13. A hydraulic control system for a transmission having a parking device, the hydraulic control system comprising:
  a source that supplies source pressure;
  a parking cylinder connected to the parking device, the parking cylinder having a parking side, a parking release side and a biasing member disposed on the parking side;
  a first valve having:
    a first input port that is in communication with the source,
    a first output port, and a first spool for selectively allowing communication between the first input port and the first output port; and
  a second valve having:
    a second input port that is in communication with downstream of the first valve,
    a second output port that is in communication with the parking release side of the parking cylinder, and
    a second spool that is movable between a parking release state and a parking state,
  wherein the second spool allows communication between the second input port and the second output port when in the parking release state and prohibits communication between the second input port and the second output port when in the parking state, and
  wherein the first spool closes the first input port in a first position of the first spool so as to block a supply of the source pressure and block communication between the first input port and the first output port.

14. The hydraulic control system according to claim 13, further comprising a first solenoid that is able to move both the first spool and the second spool.

15. The hydraulic control system according to claim 14, wherein the first solenoid is a normally-closed type.

16. The hydraulic control system according to claim 14, wherein after the source pressure is applied to the parking cylinder and the parking device is in the parking release state, a position of a parking rod can be switched between a position in which the parking rod is fixed and a position in which the parking rod is unlocked from this fixation by the first solenoid for locking.

17. The hydraulic control system according to claim 13, further comprising:
  a solenoid that pressure-regulates the source pressure to output a control pressure, wherein:
  the first spool is movable to the first position and to a second position,
  a biasing member is disposed on one end side of the first spool and biases the first spool to the first position,
  the second spool is movable to a third position and to a fourth position,
  the first output port is blocked from communication with the first input port while the first spool is in the first position and is in communication with the first input port while the first spool is in the second position,
  the second input port is in communication with the first output port,
  the second output port is in communication with the second input port while the second spool is in the third position, and is blocked from communication with the second input port while the second spool is in the fourth position,
  the second valve includes a third input port that is in communication with the first output port to receive input of the source pressure so that the second spool is biased to a direction of the fourth position by the source pressure, and
  the hydraulic control system includes a control port to which the control pressure is input so as to apply the control pressure output from the solenoid to other end side of the first spool and one end side of the second spool,
  in a case in which the control pressure is input to the control port and is applied to the other end side of the first spool and the one end side of the second spool, the first spool is moved to reach the second position against biasing force of the biasing member and the second spool is moved to reach the third position, so that the source pressure is supplied to the parking device through the second output port, and
  in a case in which the control pressure is not input to the control port and the first spool sticks in the second position, the second spool is moved to reach the fourth position by the source pressure supplied to the third input port, so that the source pressure is not supplied to the parking device.

* * * * *